United States Patent [19]

Spiridonov et al.

[11] Patent Number: 4,816,986
[45] Date of Patent: Mar. 28, 1989

[54] POWER CONTROL DEVICE FOR THE MAGNETRON OF MICROWAVE OVEN

[76] Inventors: Jury A. Spiridonov, ulitsa Scherbakovskava, 32/7, kv. 163; Vladimir I. Khandogin, Schelkovskoe shosse, 29, kv. 19; Anatoly I. Ivanov-Tsyganov, ulitsa Konstantina Simonova, 9, kv. 79, all of Moscow, U.S.S.R.

[21] Appl. No.: 153,057
[22] Filed: Feb. 8, 1988
[51] Int. Cl.[4] .................. H02M 7/537; H05B 39/00
[52] U.S. Cl. ..................... 363/132; 363/98; 363/75; 219/10.55 B; 315/106; 315/107
[58] Field of Search ............... 363/37, 75, 82, 90–91, 363/98, 132, 17; 219/10.55 B; 315/39.51, 94, 105–107; 331/86, 87; 336/211

[56] References Cited

U.S. PATENT DOCUMENTS

| | | | |
|---|---|---|---|
| 4,346,297 | 8/1982 | Suzuki et al. | 315/107 |
| 4,481,447 | 11/1984 | Stupp et al. | 219/10.55 B |
| 4,488,089 | 12/1984 | Shota | 315/106 |
| 4,504,895 | 3/1985 | Steigerwald | 363/132 |
| 4,680,506 | 7/1987 | Nilssen | 315/105 |

OTHER PUBLICATIONS

Collection Elektronnaya Tekhnika, Seriya Elektronika SVCh., Series 5, 1984, . . . pp. 50–54 (without translation).
Collection Elektronnaya Tekhnika, Seriya Elektronika SVCh., Series 4, 1981, . . . pp. 56–58 (without translation).

*Primary Examiner*—Peter S. Wong
*Attorney, Agent, or Firm*—Lilling & Greenspan

[57] ABSTRACT

A power control device for a microwave cooking oven includes a regulator of the anode voltage of the magnetron and a heater voltage source. The anode voltage regulator includes a d.c. voltage bridge-type converter, a transformer, a rectifier and a filter. The heater voltage source includes a half-bridge d.c. to a.c. voltage converter. The half-bridge and bridge converters are controlled each by signals coming from the respective generators of pulse sequences.

5 Claims, 6 Drawing Sheets

POWER CONTROL DEVICE FOR THE MAGNETRON OF MICROWAVE OVEN

BACKGROUND OF THE INVENTION

Field of the Invention

The present invention relates to microwave apparatus operated for heating dielectric materials, and more particularly it relates to a power control device for the mgnetron of a microwave cooking oven.

The invention can be utilized in various microwave apparatus for domestic and public uses, and also in low-power industrial microwave installations of the kind operated for evaporation of fluid mixtures, heat treatment of dielectric materials, control of a predetermined moisture content of a medium, and the like.

DESCRIPTION OF THE PRIOR ART

Among the most essential requirements put before contemporary household appliances are their high performance reliability in combinationwith minimized weight and dimensions, which requirements also apply to a device for controlling the power of a microwave cooking oven that is expected to be compact and light-weight and produce no electromagnetic interference transmittable via power supply circuits to other household electronic apparatus.

There is known a device for controlling the power of the magnetron of a microwave cooking oven (Collection—Elektronnaya tekhnika. Seriya Elektronika SVCh. Series, 5, 1984, Moscow, P. V. Batsev, "Sistema avtomaticheskogo upravleniya sovremennykh promyshlennykh ustanovok SVCh-nagreva. P.II Analiz rezhimov raboty dvukhchastotnogo magnetrona v sovremennykh istochnikakh SVCh energii dlya promylshlennogo nagreva", pp. 50–54), comprising a regulator of the anode voltge of the magnetron, including a current sensor and a control unit, an a heater voltage souce for the magnetron, the magnetron anode voltage regulator being in the form of a thyristor regulator with a serially coupled transformer having a choke connected in its output circuits.

This known device is relatively bulky and of a considerable weight, whereas its performance reliability is inadequate.

These shortcomings arise from the conversion and control of the power for the anode circuit of the magnetron being carried out in the known device at a low frequency, i.e. at the mains frequency of 50 or 60 Hz, which results in an increased weight and size of the transformers and filters of the device. With the thyristor regulator associated with an electronic control unit having serially connected thereto a power transformer, a powerful electromagnet and a choke included in the anode circuit of the magnetron, this represents for the thyristors of the regulator a markedly inductive load, which affects the performance reliability of the thyristors. The pulsed control of the thyristors creates an intermittent (pulsed) current causing electromagnetic interference transmittable via the electric power supply circuits and mains to other electronic apparatus.

There is further known a device for controlling the power of the magnetron of a microwave cooking oven (Collection—Elecktronnaya tekhnika. Seriya Elektronika SVCh. Series 4, 1981, Moscow, M. N. Molokhov, I. D. Maslakov, "Reguliruemyi stabilizator vykhodnoi moshchnosti magnetrona", pp. 56–58), comprising a regulator of the anode voltage of the magnetron, connected by its output to the anode circuit of the magnetron, and a source of the heater voltage of the magnetron, having its output connected to the heater-cathode filament of the magnetron. The anode voltage regulator in this device includes a thyristor with its control circuit and a transformer of which the secondary winding is connected to the anode circuit of the magnetron. The thyristor and the primary winding of the transformer are connected in series and adapted to be connected to the power mains.

The heater voltage source is in the form of an individual transformer having its primary winding connected to the power mains and its secondary winding connected to the heater-cathode filament of the magnetron. The control circuit produces signals governing the duration of the energized state of the thyristor, i.e. of the voltage supply to the primary winding of the transformer. In this way there is varied the duration of the microwave energy pulses generated by the magnetron in each half-cycle of the supply voltage, while the mean power of the microwave energy is maintained at a preset level.

Unlike the first-described known device, this device is devoid of the choke affecting the performance reliability of the thyristors.

However, the last-described known device likewise carries out the conversion and control of the power for the anode circuit of the magnetron directly at the mains frequency, i.e., the switching of the thyristors and the operation of the transformer take place at the mains frequency, which results in an increased weight and dimensions of the transformer and filters and also in increased power consumption due to a significant no-load current value, thus brining down the efficiency factor. The magnetron in this known device operates in a mode that cannot be considered optimal, as the voltage fed to its anode is shalped as half-sine waves impairing the efficiency of utilization of the full power capacity of the magnetron. This situation is due to the fact that, first and foremost, the frequency spectrum generated by the magnetron is extended, whereas the anode voltage values yielding the maximum power output of the magnetron would be maintained within but a brief interval of the supply voltage cycle. With no stabilization of the heater voltage of the magnetron, the service life of its heater-cathode is curtailed, as fluctuations of the input voltage would result in variations of the heater-cathode temperature in magnetron, affecting its optimized utilization in the magnetron and eventually causing untimely failures on account of either overheating or underheating.

SUMMARY OF THE INVENTION

It is an object of the present invention to reduce the dimensions and weight of a device for controlling the power of the magnetron of a microwave oven.

It is another object of the present invention to enhance the performance reliability of this device.

It is still another object of the present invention to bring down the level of electromagnetic interference produced by a device for controlling the power of the magnetron of a microwave oven, transmittable via power supply circuits.

It is yet another object of the present invention to step up the efficiency factor of the device.

These and other objects are attained in a device for controlling the power of the magnetron of a microwave oven, comprising a regulator of the anode voltage of the magnetron, having its output connected to the anode circuit thereof, and a source of the heater voltage of the magnetron, having its output connected to the heater-cathode filament. In accordance with the invention, the anode voltage regulator comprises a series connection of a d.c. voltage to a.c. voltage bridge-type converter of which the input is the power input of the anode voltage regulator, a transformer, a rectifier and a filter of which the output is the first output of the anode voltage regulator intended for connection to the anode circuit of the magnetron, the anode voltage regulator further including a diode having its input connected to the power input of the anode voltage regulator and its output serving as the second output of the anode voltage regulator, the device further comprising a series connection of a d.c. voltage source, a current amplitude shaper having its control input connected to the output of the filter an a saturable magnetic element having its output connected to the primary winding of the transformer; the device still further comprising a generator of sequences of control pulses for the anode voltage regulator, having its input connected to the output of the master control of the microwave cooking oven operating mode and its output connected to the control inputs of the bridge-type converter; the heater voltage source including a series connection of a half-bridge d.c. to a.c. voltage converter having its power input connected to the second output of the anode voltage regulator and another transformer having at least two secondary windings, the terminals of its one secondary winding being the output of the heater voltage source intended for connection to the heater-cathode filament of the magnetron; the device still further comprising a generator of sequences of pulses for heater voltage stabilization, having its input connected to another secondary winding of the transformer of the heater voltage source and having its outputs connected to the control inputs of the half-bridge converter; the device also comprising a series connection of a mains voltage rectifier of which the input serves as the power input of the device, a starting current limiter, a capacitance filter and a choke having its output connected to the power input of the anode voltage regulator.

It is expedient that in the device the magnetic saturable element should comprise two coaxially arranged toroidal cores, a control winding having its turns encompassing both toroidal cores and a working winding made of two oppositely connected half-windings of which one is carried by one of the toroidal cores and the other one is carried by the other toroidal core.

Alternatively, it may be expedient for the magnetic saturable element to include a toroidal core defining an annular cavity coaxial therewith, and the control and working windings of which the control winding is accommodated in the annular cavity coaxially therewith and the working winding is wound externally onto the toroidal core so that the planes accommodating its turns are orthogonal with respect to the planes accommodating the turns of the control winding.

It is reasonable for the current amplitude shaper of the device to include a power transistor of which the input and output are, respectively, the input and output of the current amplitude shaper, and a series connection of a comparison circuit of which one input is the control input of the current amplitude shaper and the other input is connected with the output of a reference voltage source, and a d.c. voltage amplifier having its output connected with the control input of the power transistor.

It is expedient that the generator of sequences of control pulses in the device should include a series connection of a clock pulse generator, an AND gate, a first pulse counter, a second pulse counter another AND gate, a self-excited oscillator with synchronizing inputs of which the output is the output of the generator of control pulse sequences, and still another AND gate having its output connected with the other inputs of the first-mentioned AND gates and its input serving as the control input of the generator of control pulse sequences, and one more AND gate having its inputs connected, respectively, to the outputs of the second pulse counter and of the last-mentioned AND gate, and its output connected to the input of the self-excited oscillator.

The device for controlling the power of the magnetron of a microwave oven, constructed in accordance with the present invention, provides for stabilization of the anode voltage of the magnetron at a present permanent level, which allows to utilize the power capacity of the magnetron to a higher efficiency, to step up the factor of utilization of the anode voltage and, hence, to enhance the efficiency factor of the device, as a whole.

A device constructed in accordance with the present invention is adapted for operation at a high frequency, which has allowed to reduce its overall dimensions and weight, to bring down the level of electromagnetic interference produced by the device and transmittable via power supply circuits to other electronic apparatus, and to enhance the performance reliability of the device.

The stability of the heater voltage of the magnetron throughout a broad range of eventual destabilizing factors, ensured by the device in accordance with the invention, steps up still further the performance reliability of the magnetron of a microwaave cooking oven.

BRIEF DESCRIPTION OF THE DRAWINGS

The invention will be further described in connection with its embodiments in a power control device for the magnetron of a microwave cooking oven, with reference being made to the accompanying drawings, wherein.

Figure 10:
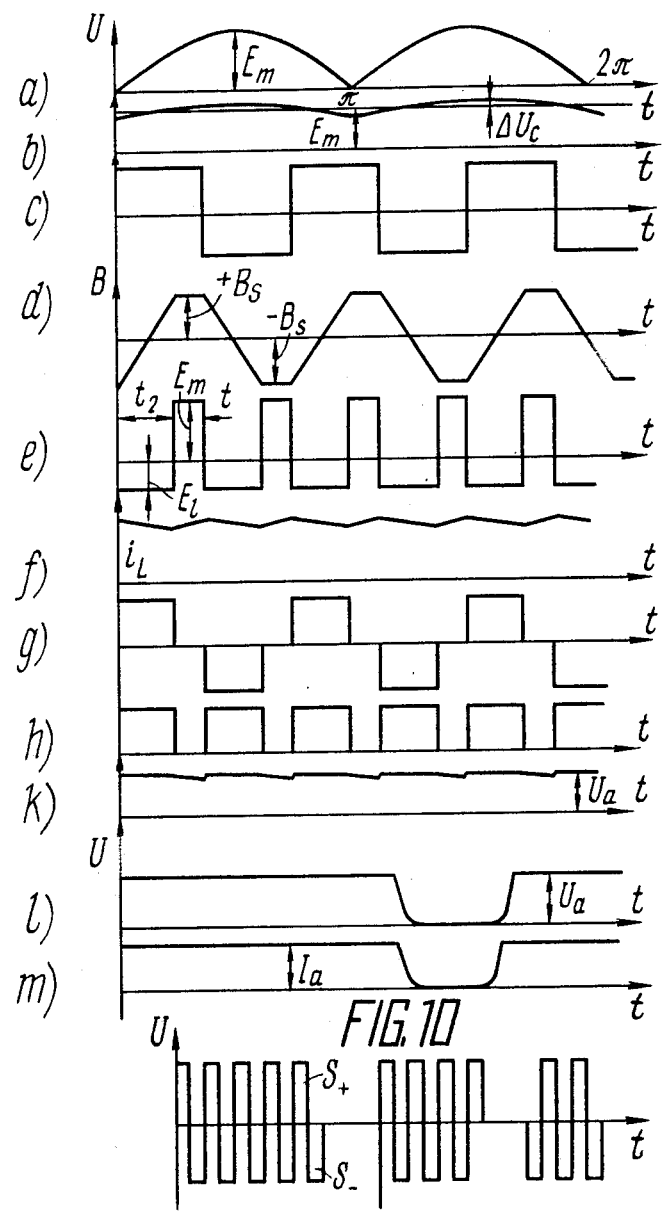
FIGS. 10a, b, c, d, e, f, g, h, k l, m presents charts of voltage variations at different points of the circuitry illustrated in FIG. 1, demonstrating the operation of the device in accordance with the invention.
Figure 11:
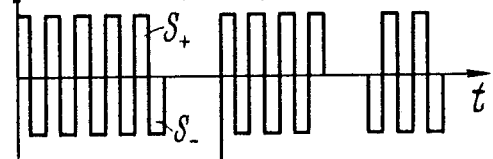
FIG. 11 presents a chart of variation of a signal at the output of the generator of control pulse sequences for the anode voltage regulator.

In the drawings, FIGS. 10 and 11, the Y-axis is calibrated in values of voltage "U", volts and the X-axis is calibrated in values of time "t", seconds.

DESCRIPTION OF THE PREFERRED EMBODIMENT

Figure 1:
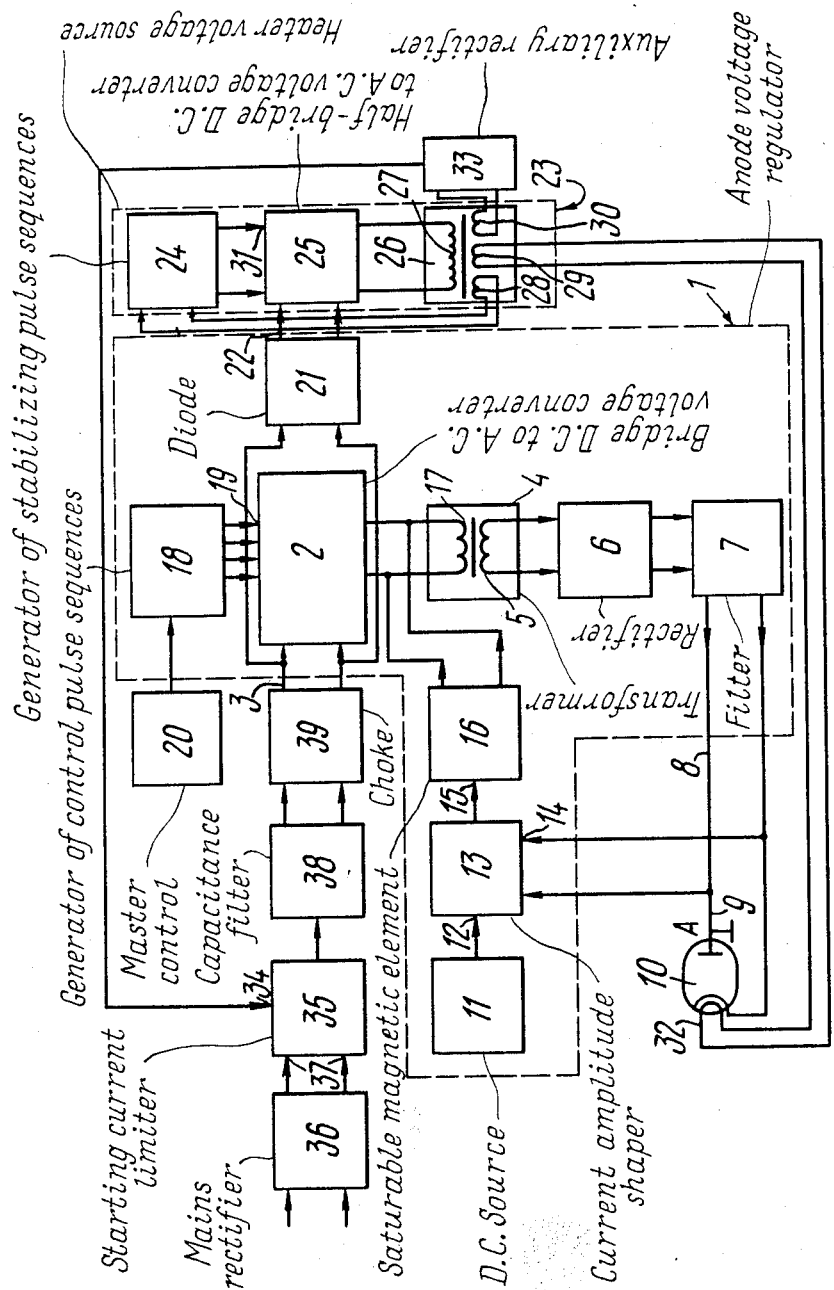
FIG. 1 is a block unit diagram of a power control device for the magnetron of a microwave cooking oven, according to the invention.

The device for controlling the power of the magnetron of a microwave cooking oven schematically illustrated in FIG. 1 comprises an anode voltage regulator 1 including a series connection of a bridge-type d.c. voltage to a.c. voltage converter 2 of which the input is the power input 3 of the anode voltage regulator 1, a transformer 4 having its secondary winding 5 connected to the input of a rectifier 6, and a filter 7 of which the output is the first output 8 of the anode voltage regulator 1, connected to the anode circuit 9 of the magnetron 10. The anode voltage regulator 1 further includes a d.c. source 11 having connecting to its output the power input 12 of a current amplitude shaper 13 of which the control input 14 is connected to the anode circuit 9 of the magnetron 10, while the output of the current amplitude shaper 13 is connected to the input 15 of a saturable magnetic element 16 connected in parallel with the primary winding 17 of the transformer 4. Furthermore, the anode voltage regulator 1 includes a generator 18 of sequences of control pulses for the operation of this regulator 1, having its outputs connected to the control inputs 19 of the bridge-type d.c. voltage to a.c. voltage converter and its input connected to the master control 20 operable to select the operating modes of the microwave cooking oven, and a diode 21 of which the input is connected to the power input 3 of the bridge-type converter 2, while the output of the diode 21 is the second output 22 of the anode voltage regulator 1, connected to the input of a heater voltage source 23. The heater voltage source 23 includes a series connection of a generator 24 of pulse sequences for heater voltage stabilization, a half-bridge d.c. voltage to a.c. voltage converter 25 and a transformer 26 having a primary winding 27 and secondary windings 28, 29, 30. The generator 24 of stabilizing pulse sequences has its input connected to the terminals of the secondary winding 28 of the transformer 26, and its outputs connected to the control inputs 31 of the half-bridge converter 25. The terminals of the secondary winding 29 of the transformer 26 are the outputs of the heater voltage source 23, connected to the heater-cathode filament 32 of the magnetron 10. The terminals of the secondary winding 30 are connected to the inputs of an auxiliary rectifier 33 of which the output is connected with the control input 34 of a starting current limiter 35. The herein disclosed device for controlling the power of the magnetron of a microwave cooking oven further comprises a series connection of a mains voltage rectifier 36 of which the input is the power input of the power control device for the magnetron of a microwave cooking oven, connectable to power mains and the output is connected with the power input 37 of the starting current limiter 35, a capacitance filter 38 and a choke 39 having its output connected to the power input 3 of the magnetron anode voltage regulator 1.

Figure 2:
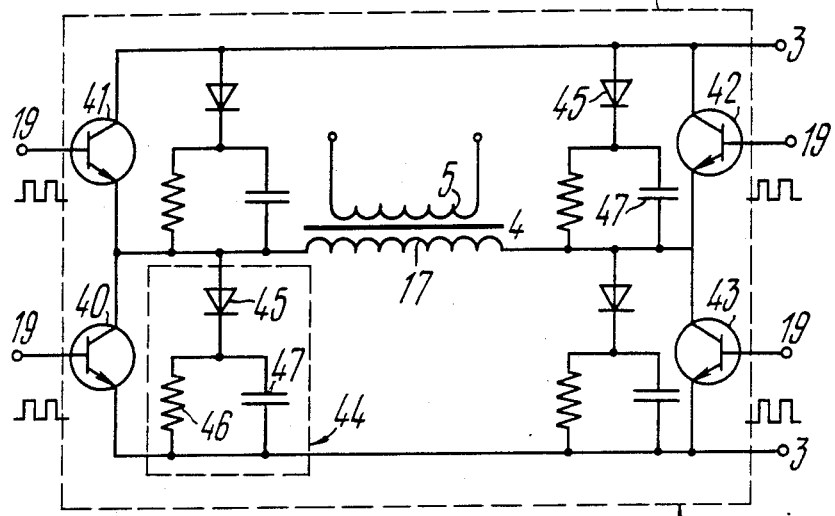
FIG. 2 is the circuit diagram of the bridge-type d.c. voltage to a.c. voltage converter.

FIG. 2 presents the circuit diagram of a version of the bridge-type d.c. to a.c. voltage converter 2. The converter 2 of this version comprises four controlled transistor gates 40, 41, 42, 43 wired into the respective four arms of the bridge circuit of which one diagonally opposite pair of junctions is connected to the power input 3 of the anode voltage regulator, and the other diagonally opposite pair of junctions has connected between them the primary winding 17 of the transformer 4. The control inputs of the transistor gates 40–43 are the respective control inputs 19 of the bridge-type converter 2.

To minimize dynamic losses at the transistor gates 40–43, each gate is connected in parallel with a circuit 44 including a diode 45 connected across a parallel connection of a resistor 46 and capacitor 47.

Figure 3:
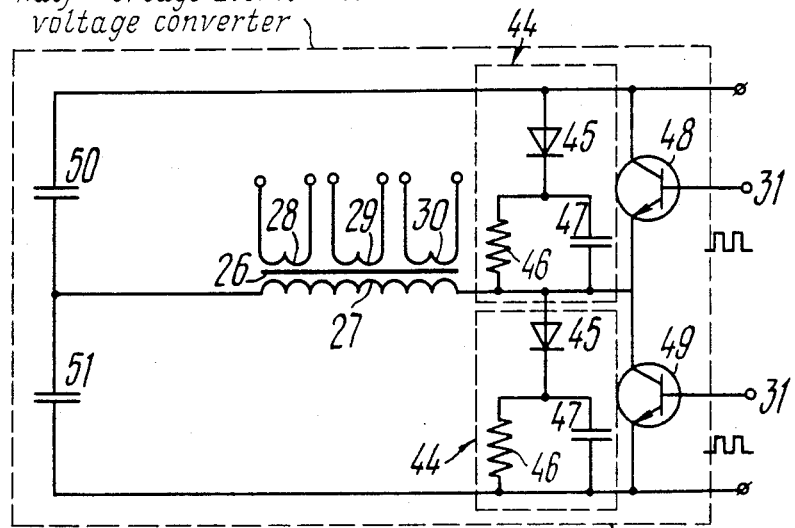
FIG. 3 is the circuit diagram of the half-bridge d.c. voltage to a.c. voltage converter.

FIG. 3 presents the circuit diagram of a version of the half-bridge d.c. to a.c. voltage converter 25. the converter 25 includes a bridge circuit with controlled transistor gates 48, 49 wired into the respective arms of its one adjacent pair of arms, while capacitors 50, 51 are wired into the respective arms of the other pair. One pair of diagonally opposite junctions of the bridge circuit serves as the power input of the half-bridge converter 25, and the other pair of diagonally opposite junctions of the bridge circuit has connected between them the primary winding 27 of the transformer 26. The control inputs of the transistor gates 48, 49 are connected to the control inputs of the half-bridge converter 25. To minimize dynamic losses at the transistor gates 48, 49, they are connected in parallel with their own circuits 44 of the abovedescribed type.

Figure 4:
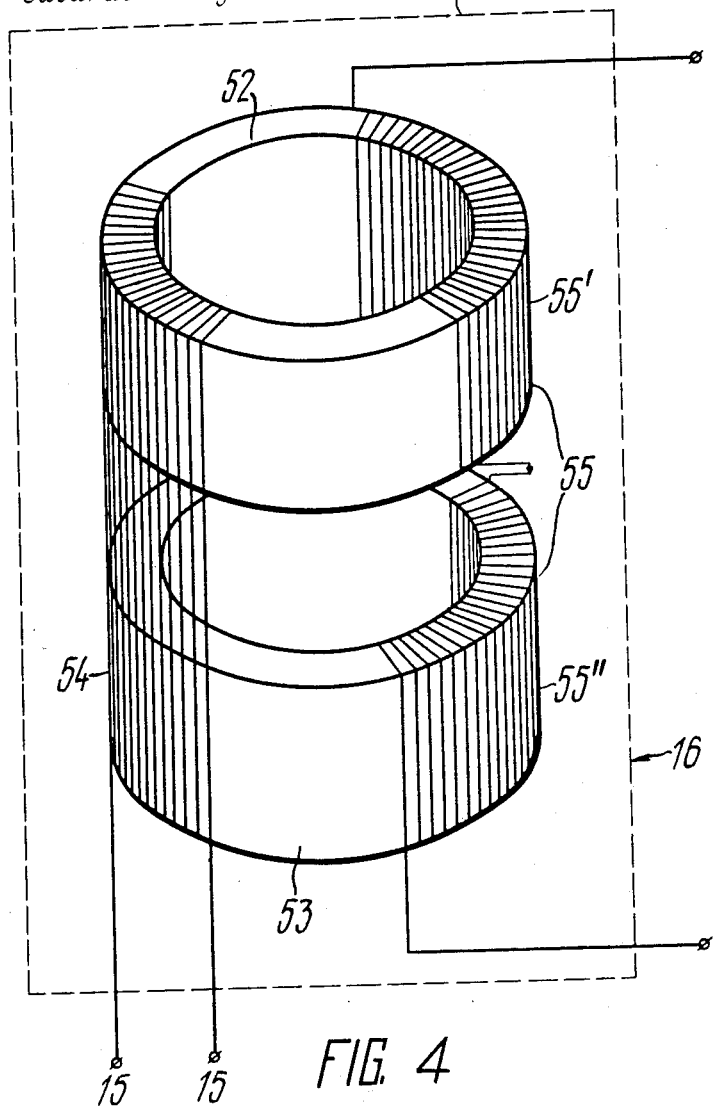
FIG. 4 is a schemaic perspective view of the saturable magnetic element with two toroidal cores.

A version of the saturable magnetic element 16 illustrated in FIG. 4 has a pair of coaxial toroidal cores 52, 53, a control winding 54 whose turns encompass both cores 52 and 53 and whose ends are connected to the input terminals 15 of the saturable magnetic element 16, and a working winding 55 including two oppositely connected half-windings 55' and 55" accommodated, respectively, on the cores 52 and 53, the terminal ends of the winding 55 being connected to the output terminals of the saturable magnetic element 16.

Figure 5:
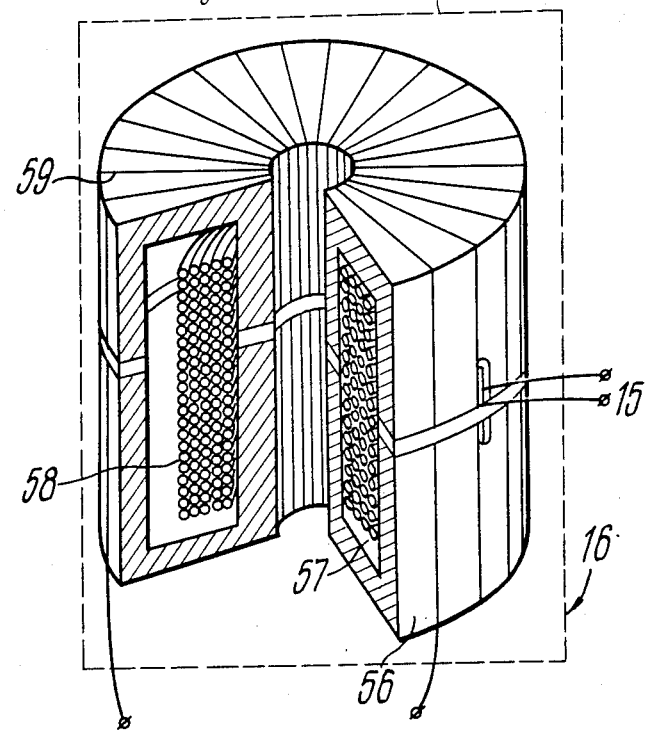
FIG. 5 is a partly sectional perspective view of the saturable magnetic element with one toroidal core.

Another version of the saturable magnetic element 16 illustrated in FIG. 5 has a single toroidal core 56 defining a coaxial annular cavity 57 accommodating a control winding 58 coaxial with the cavity 57, and a working winding 59 wound onto the toroidal core 56. The windings 58 and 59 are so relatively oriented that planes accommodating the respective turns of the working winding 59 are arthogonal with respect to the planes accommodating the turns of the control winding 58. The terminal ends of the control winding 58 are connected to the input terminals 15 of the saturable magnetic element 16, and the terminal ends of the working winding 59 are the respecetive output terminals of the element 16. The toroidal core 56 is split at half its height to facilitate the assembling of the saturable magnetic element 16.

The mains voltage rectifier 36 (its circuit diagram not shown) can be of any suitable known structure, e.g. a bridge circuit with diodes included in its arms and a pair of diagonally opposite junctions connectable to the mains supply.

The capacitance filter 38 (its circuit diagram is not shown, either) can likewise be of any suitable known structure, e.g. as a set of capacitors connected in parallel.

Figure 6:
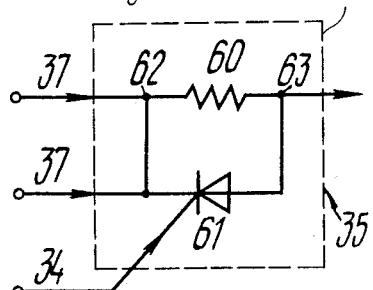
FIG. 6 is the circuit diagram of the starting current limiter.

FIG. 6 presents the circuit diagram of the starting current limiter 35 including a parallel connection of a resistor 60 and a controlled gate 61, the control input of the gate 61 being connected to the control input 34 of the limiter 35. The power input 37 of the starting current limiter 35 is connected to the junction 62 of one terminal of the resistor 60 and the first power electrode of the semiconductor gate 61, the junction 63 of the other terminal of the resistor 60 and the other power electrode of the semiconductor gate 61 is the output of the starting current limiter 35.

Figure 7:
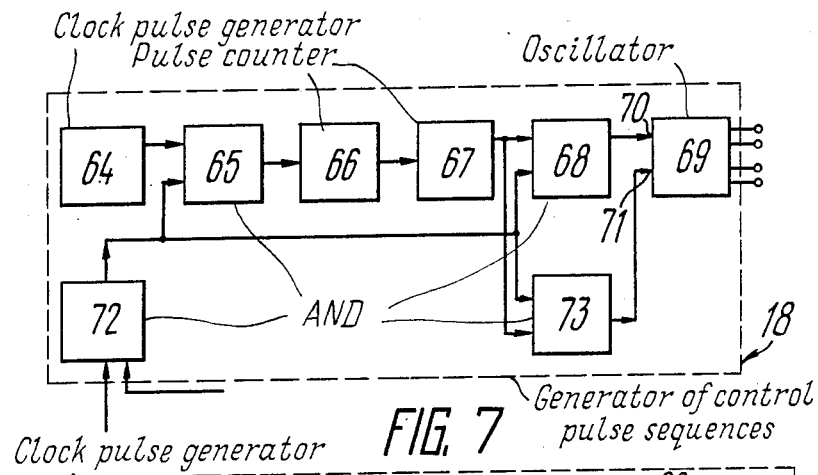
FIG. 7 is a block unit diagram of the generator of sequences of control pulses for the anode voltage regulator.

FIG. 7 is an example of the circuitry (in a block-unit diagram) of the generator 18 of sequences of control pulses for the anode voltage regulator of the magnetron, including a series connection of a clock pulse generator 64, an AND gate 65, a first pulse counter 66, a second pulse counter 67, another AND gate 68 and a self-excited oscillator 69 with synchronizing inputs 70, 71. Furthermore, the generator 18 of control pulse sequences includes a third AND gate 72 having its output connected to the other inputs of the AND gates 65 and 68 and its input serving as the control input of the generator 18 of control pulse sequences, and a fourth AND gate 73 having its inputs connected, respectively, to the outputs of the counter 67 and of the AND gate 72 and its output connected to the other input 71 of the self-excited oscillator 69 whose outputs are the outputs of the generator 18 of control pulse sequences.

Figure 8:
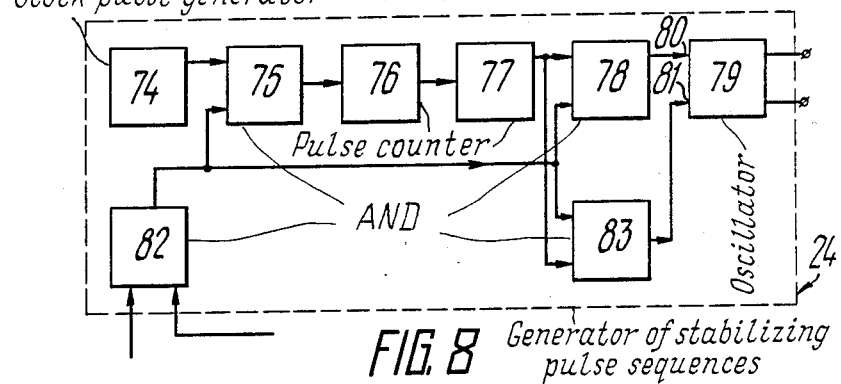
FIG. 8 is a block unit diagram of the generator of pulse sequences for heater voltage stabilization.

FIG. 8 is an example of the circuitry (also in a block-unit diagram) of the generator 24 of heater voltage stabilizing pulse sequences, including a series connection of a generator 74 of clock pulses, an AND gate 75, a first pulse counter 76, a second pulse counter 77, an AND gate 78, and a self-excited oscillator 79 with synchronizing inputs 80, 81, of which the outputs are the outputs of the generator 24 of pulse sequences. The generator 24 of the pulse sequences further includes a third AND gate 82 having its output connected to the other inputs of the AND gates 75 and 78 and its input connected to the secondary winding 28 (FIG. 1) of the transformer 26, a fourth AND gate 83 (FIG. 8) having its inputs connected, respectively, to the outputs of the second pulse counter 77 and of the AND gate 82 and its output connected to the other input 81 of the self-excited oscillator 79.

Figure 9:
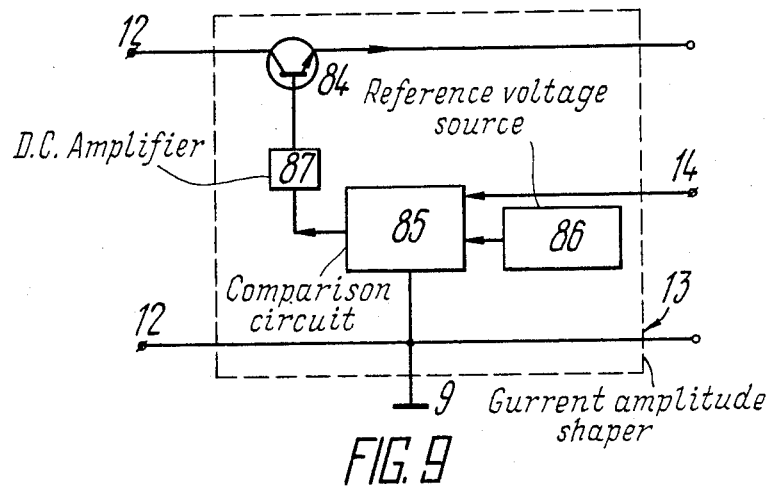
FIG. 9 is a block unit diagram of the current amplitude shaper.

FIG. 9 is an example of the circuitry of the current amplitude shaper 13 including a power transistor 84 of which the input and output are, respectively, the input 12 and output of the current amplitude shaper 13, and a series connection of a comparison circuit 85 of which one input is the control input 14 of the current amplitude shaper 13 and the other input is connected to the output of a reference voltage source 86, and a d.c. amplifier 87 having its output connected to the control input of the power transistor 84.

The power control device for the magnetron of a microwave cooking oven embodying the invention operates as follows.

With the device connected to the domestic a.c. power supply mains, the mains voltage rectifier 36 (FIG. 1) rectifies this voltage (the chart of time-related variation of this output voltage of the rectifier 36 is shown in FIG. 10a). Then this voltage is filtered by the capacitance filter 38, the latter being selected to have adequately high capacity so that the level of pulsation $U_c$ should not exceed 2–5% of the amplitude (rectified) $E_m$ of the voltage (FIG. 10b). As the total capacitance of the capacitors making up the filter 38 is considerable, to protect the household against excessive leaps of the elecrric current in the mains which could cause fires and malfunctioning of other electric and electronic household appliances (e.g. frame scan failures in television receivers) the starting current limiter 35 is included between the rectifier 36 and the capacitance filter 38. At the initial period, the capacitors of the capacitance filter 38 are charged through the resistor 60 (FIG. 6), and then (generally, after 1 second), the controlled gate 61 shunts the resistor 60.

The d.c. voltage is fed from the capacitance filter 38 (FIG. 1) via the choke 39 to the input 3 of the anode voltage regulator. The regulator 1 incorporates the bridge-type voltage converter 2 whose control inputs 19 are fed with square-tooth voltage of the meander type (FIG. 10c).

The transistor gates 40 (FIG. 2), 41, 42, 43 of the bridge-type transtorized voltage converter 2 are alternatingly in two quasi-stable states. The time of the stable state equals half the cycle of the control voltage coming to the inputs 19 of the converter 2 from the generator 18 (FIG. 1) of sequences of control pulses. Connected in parallell with the primary winding 17 of the transformer 4 of the bridge-type voltage converter 2 is the working winding 55 (FIG. 4) or 59 (FIG. 5) of the saturable magnetic element 16.

Let us consider the operation of the herein disclosed device with the version of the saturable magnetic element 16 illustrated in FIG. 5. The current flowing through the current amplitude shaper 13 (FIG. 1) and the control winding 58 (FIG. 5) of the saturable magnetic element 16 induces in the core 56 the transverse component $B_x$ of magnetic induction:

$$B_x = \mu\mu_o T W_1 / l_o,$$

where
  $B_x$ is the component of magnetic induction saturating the core 56 in the direction of the X-axis;
  $\mu$ is magnetic permeability of the material of the core 56;
  $\mu_o$ is magnetic permeability of vacuum;
  T is the current flowing through the current amplitude shaper 13;
  $W_1$ is the number of turns of the control winding 58;
  $l_o$ is the mean length of a magnetic line of force in the core 56.

The longitudinal component $B_y$ of magnetic induction produced by the current flowing through the working winding 59 of the saturable magnetic element 16 is defined by the ratio:

$$B_y = \frac{E_m \, 10^4}{4 f Q \, W_2},$$

where
  $E_m$ is the amplitude of voltage at the output of the rectifier 36;
  f is the frequency of control pulses at the inputs 19 of the converter 2;
  Q is the cross-sectional area of the magnetic material of the core 56 in a plane including the Y-axis;
  $W_2$ is the number of turns of the working winding 59.

The total induction B in the core 56 of the saturable magnetic element 16 is defined as:

$$B = \sqrt{B_x^2 + B_y^2} \leq B_s,$$

where $B_s$ is the saturation induction of the material of the core 56 of the saturable magnetic element 16.

With no current flowing through the current amplitude shaper 13, the value of induction B in the core 56 would vary within a range:

$$+B_s > B > -B_s$$

With current starting to flow in the control winding 58 of the saturable magnetic element 16, within a part of a half-cycle of the control voltage coming to the inputs 19 the induction B in the core 56 would be permanent and would equal $B_s$, i.e. the saturable magnetic element 16 would acquire the state of saturation (see FIG. 10d). The time of the element 16 being in the state of saturation is $t_1$, and the time during which the induction B in the element 16 varies linearly is $t_2$. During the time $t_1$ the output of the bridge-type voltage converter 2 is shunted by the low output impedance of the element 16. The current flowing through the transistor gates 40-43 (FIG. 2) does not grow, as the choke 39 is included in the power supply circuit of the bridge-type converter 2. During the time $t_1$ the voltage applied across the choke 39 equals $E_m$. Following the switching of the transistor gates 40-43, the magnetic saturable element 16 leaves the state of saturation, but the choke 39 inverts the voltage at its winding, and this voltage is added to the voltage across the capacitance filter 38 and fed to the input 3 of the bridge-type voltage converter 2 (FIG. 10). The amplitude $E_m$ of the voltage across the choke 39 is defined by an expression:

$$E_m t_1 - E_L t_2 = 0.$$

$$E_L = E_m t_1 / t_2$$

The voltage applied to the input 3 of the bridge-type voltage converter 2 equals:

$$E = E_L + E_m \text{ with } 0 \leq t \leq t_2,$$

or $E = 0$ with $t_2 \leq t \leq t_1$.

The shape of the varying voltage across the coke 39 can be seen in FIG. 10e.

With the inductance L of the choke 39 properly selected, the current $i_L$ flowing through the choke 39 would be practically constant (FIG. 10f), which is attained by selected the value of L from an inequality:

$$L > \frac{E_m (q - 1)}{4 f I_{min} q^2},$$

where $$q = \frac{t_2 + t_1}{t_1},$$

i.e. q is the full time to saturation time ratio of the saturable magnetic element 16; and
$I_{min}$ is the minimum current at the input 3 of the voltage converter 2.

The secondary winding 5 of the transformer 4 shapes pulses of alternating polarity with intervening pauses (see FIG. 10g), to be subsequently rectified into unipolar pulses (see FIG. 10h) by the rectifier 6 and filtered out by the capacitance filter 7 (FIG. 10k). The capacitors of the capacitance filter 7 are charged to a value equalling:

$$(E_m + E_L) n = U_a,$$

where
$U_a$ is the voltage across the output of the filter 7,
n is the transformation ratio of the transformer 4.

The capacitance of the capacitor of the filter 7 is selected for pulsation of voltage at the output of the filter 7 to equal zero. This permanent voltage is fed to the anode circuit 9 of the magnetron 10 and to the control input 14 of the current amplitude shaper 13. A part of the output voltage $U_a$ is compared with the standard or reference voltage from the source 86 (FIG. 9) in the comparison circuit 85, and a mismatch signal is fed to the power transistor 84 controlling the current through the control winding 58 (FIG. 5) of the saturable magnetic element 16. Considering that:

$$U_a = n E_m \left(1 + \frac{t_1}{t_2}\right),$$

with the value $E_m$ varying, the value of $t_1$ is varied so as to maintain the permanence of $U_a$.

In case of voltage fluctuations in the supply mains, e.g. when the voltage at the input of the mains rectifier 36 (FIG. 1) drops, the current flowing through the control winding 58 (FIG. 5) is increased, which means that the core 56 of the saturable magnetic element 16 remains longer in the state of saturation (FIG. 10e). The saturable magnetic element 16 with two toroidal cores, illustrated in FIG. 4, operates similarly, the only difference being that the vector B of induction produced by the current flowing through the control winding 54 and by the currents flowing through the half-windings 55' and 55" of the working winding 55 is one and the same plane.

With the amplitude $E_m(1 + t_1/t_2)$ of the voltage at the input 3 of the bridge-type converter 2 being stabilized, the voltage across the capacitors 50, 51 (FIG. 3) of the half-bridge voltage converter 25 would likewise be stabilized. The transistor gates 48, 49 of the half-bridge voltage converter 25 are controlled by the generator 24 (FIG. 1) of pulse sequences, the input of the generator 24 being connected to the winding 28 of the transformer 26 so as to maintain a stable acting value of the heater voltage. The microwave power output of the oven is controlled by varying the on off time ratio of the magnetron 10. This is obtained by the input of the generator 18 of control pulse sequences for the anode voltage regulator 1 being connected to the output of the oven operating mode master control 20 which predetermines the periodicity of the feed of control pulse sequences to the inputs 19, offering the following choice of operating modes:

"warm", "low heat", "defreezing", "stewing", "boiling", "baking", "frying", "warming-up", "fast warming".

With no control pulses fed to the inputs 19, the transistor gates 40-43 of the bridge-type voltage converter 2 become non-conductive, which causes a discharge of the capacitor of the filter 7 and termination of the anode voltage and current of the magnetron 10 (FIG. 10l, m).

In case of a failure of the heater voltage source 23 (FIG. 1) or elase of a failure or burning-out of the heater-cathode filament circuit (which is the major type of magnetron failures), the voltage at the output of the auxiliary rectifier 33 would cease, which results in the controlled gate 61 (FIG. 6) becoming non-conductive in the next successive half-cycle of the a.c. voltage fed to the input of the current limiter 35 (owing to the current flowing through the controlled gate 61 falling to zero). Thus, with the controlled gate 61 rendered non-conductive, the current flows through the resistor 60, which limits the overload current and the increase of the voltage across the anode-cathode gap of the magnetron 10 in the no-load mode. This protection prevents failures associated with electrical breakdowns caused by elevated voltages in the anode circuit. Otherwise such failures could have harmed irreversibly the transformer, diodes, capacitors and the entire structure of the device.

Let us consider in some more detail the operation of the generator 18 (FIG. 1) of pulse sequences. The generator 64 of clock pulses (preferably, a quartz-type oscillator with a 10–20 MHz frequency) is connected to the pulse counters 66, 67 through the AND gate 65, while the outputs of the pulse counters 66, 67 are likewise connected through the AND gates 68, 73 to the synchronizing inputs 70, 71 of the self-excited oscillator 69. The AND gate 72 forms a signal at its output when both its inputs receive the respective signals from the oven master control and from the heater voltage source when the heater-cathode of the magnetron is fully warmed up. The output signal of the AND gate 72 comes to the other inputs of the AND gates 65, 68 and 73, opening these gates and letting clock pulses from the clock pulse generator 64 pass to the conters 66, 67 and then to the synchronizing inputs 70, 71 of the self-excited oscillator 69, is which way the generating of a control pulse sequence is started. With no signal coming to either input of the AND gate 72, the counters 66, 67 become disconnected from the clock pulse generator 64 and from the synchronizing inputs of the self-excited oscillator 69 by the AND gates 65, 68, 73, respectively. The pulse counters 66, 67 store their attained state. With signals coming once again to both inputs of the AND gate 72, the pulse counters 66, 67 resume the counting, and a new sequence is formed as a continuation of the preceding sequence of control pulses (FIG. 11). This structure of the generator 18 of control pulse sequences provides for maintaining equality of the areas of the positive ($S_+$) and negative ($S_-$) half-cycles, and for avoiding a current rise in one of the initial half-cycles of an acting sequence of pulses, thus preventing voltage leaps at the choke 39 and unsteady performance of the anode voltage regulator 1 and of the heater voltage source 23.

What we claim is:

1. A power control device for the magnetron of a microwave cooking oven, comprising:
   a mains voltage rectifier having an input serving as the input of said device, and an output;
   a starting current limiter having a power input connected to said output of said mains voltage rectifier, a control input and an output;
   a capacitance filter having an input connected to said output of said starting current limiter, and an output;
   a choke having an input connected to said output of said capacitance filter, and an output;
   a master control of the operating modes of said microwave oven, having an output;
   an anode voltage regulator having a power input connected to said output of said choke, a control input connected to said output of said master control, a first output adapted for connection to the anode circuit of said magnetron, and a second output;
   a heater voltage source for said magnetron, having an input connected to said second output of said anode voltage regulator, and an output adapted for connection to the heater filament of said magnetron;
   said anode voltage regulator including:
   a bridge-type d.c. voltage to a.c. voltage converter having a power input connected to said power input of said regulator, control inputs, and an output;
   a transformer having a primary winding with terminals connected with said output of said bridge-type converter, and a secondary winding with terminals;
   a rectifier having an input connected to said terminals of said secondary winding of said transformer, and an output;
   a filter having an input connected to said output of said rectifier and an output connected to said first output of said anode voltage regulator;
   a generator of control pulse sequences for said anode voltage regulator, having an input connected to said control input of said regulator and outputs connected to said respective outputs of said bridge-type converter;
   a d.c. voltage source having an output;
   a current amplitude shaper having a power input connected to said output of said d.c. voltage source, a control input connected to said anode circuit of said magnetron, and an output;
   a saturable magnetic element having an input connected to said output of said current amplitude shaper, and an output connected to said terminals of said primary winding of said transformer;
   a diode having an input connected to said power input of said regulator and an output connected to said second output of said regulator;
   said heater voltage source including:
   a half-bridge d.c. voltage to a.c. voltage converter having a power input connected to said input of said heater voltage source, control inputs and an output;
   a transformer having a primary winding with terminals connected to said input of said half-bridge converter, first, second and third secondary windings with their respective terminals;
   said first secondary winding having its terminals connected to said output of said heater voltage source;
   a generator of sequences of heater voltage stabilizing pulses, having an input connected to said terminals of said second secondary winding and outputs connected to said respective control inputs of said half-bridge converter;
   an auxiliary rectifier having an input connected to said terminals of said third secondary winding, and an output connected to said control input of said starting current limiter.

2. A device as set forth in claim 1, wherein said saturable magnetic element includes:
   a first toroidal core;
   a second toroidal core coaxial with said first core;

a control winding with turns encompassinag both said first and second toroidal cores, having terminals connected to said input of said saturable magnetic element;

a working winding comprising oppositely connected first and second half-windings, having terminals connected to said output of said saturable magnetic element;

said first half-winding being carried by said first core;

said second half-winding being carried by said second core.

3. A device as set forth in claim 1, wherein said saturable magnetic element includes:

a toroidal core;

an annular cavity in said toroidal core, coaxial therewith;

a control winding accommodated in said annular cavity coaxially therewith, having terminals connected to said input of said saturable magnetic element;

a working winding wound externally on said toroidal core so that the planes accommodating its turns are orthogonal with respect to the planes accommodating the turns of said control winding, having terminals connected to said output of said saturable magnetic element.

4. A device as set forth in claim 1, wherein said current amplitude shaper includes;

a power transistor having an input connected to said power input of said shaper, an output connected with said output of said shaper, and a control input;

a source of reference voltage having an output;

a comparison circuit having a first input connected to said output of said reference voltage source, a second input connected to said control input of said shaper, and an output;

a d.c. amplifier having an input connected to said output of said comparison circuit, and an output connected to said control input of said power transistor.

5. A device as set forth in claim 1, wherein said generator of control pulse sequences for said regulator of the anode voltage of said magnetron includes:

a generator of clock pulses having an output;

a first AND gate having a first input connected to said output of said clock pulse generator, a second input and an output;

a first pulse counter having an input connected to said output of said first AND gate, and an output;

a second pulse counter having an input connected to said output of said first pulse counter, and an output;

a second AND gate having a first input connected to said output of said second pulse counter, a second input and an output;

a self-excited oscillator having a first synchronizing input connected to said output of said second AND gate, a second synchronizing input, and outputs connected to said outputs of said generator of control pulse sequences;

a third AND gate hvaing a first input connected with said control input of said generator of control pulse sequences, a second input and an output connected to said respective second inputs of said first and second AND gates;

a fourth AND gate having a first input connected to said output of said second counter, a second input connected to said output of said third AND gate, and an output connected to said second synchronizing input of said self-excited oscillator.

* * * * *